May 20, 1924.  1,494,982
J. SIDES
ICE CREAM DISPENSING MACHINE
Filed June 12, 1922
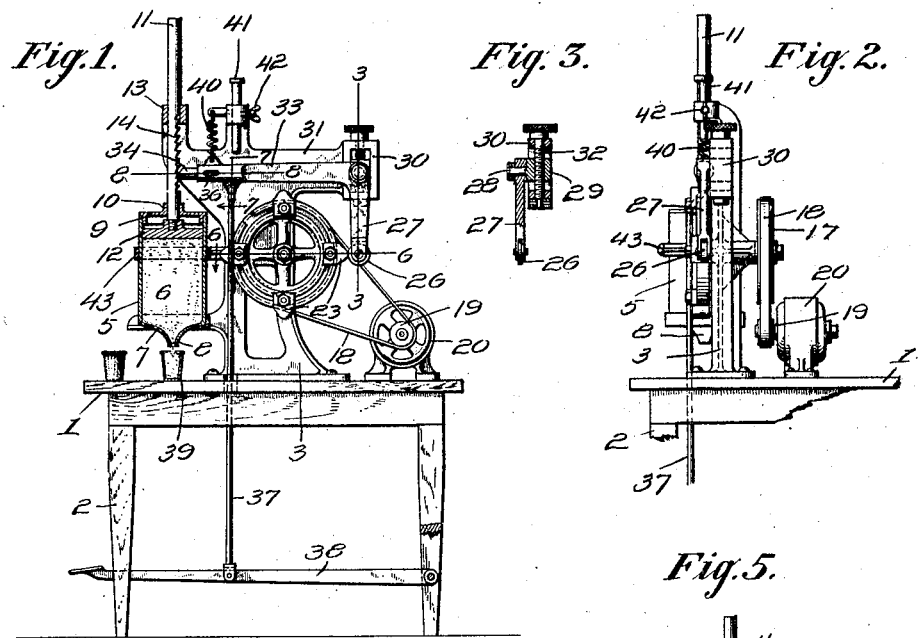
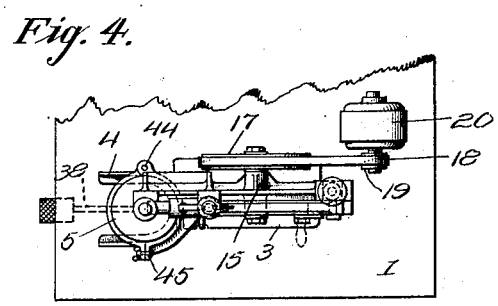
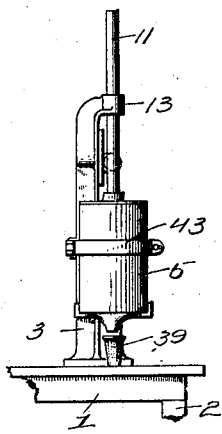
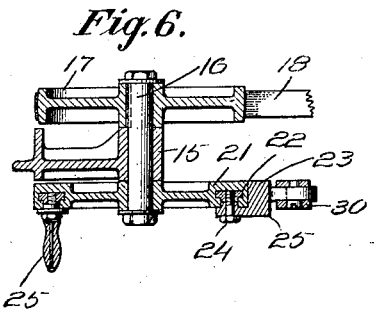
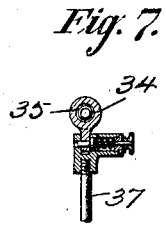
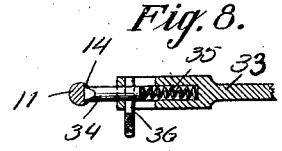
J. Sides. INVENTOR.
BY Geo. P. Kimmel
ATTORNEY.

Patented May 20, 1924.

1,494,982

UNITED STATES PATENT OFFICE.

JUDSON SIDES, OF ABILENE, TEXAS.

ICE-CREAM-DISPENSING MACHINE.

Application filed June 12, 1922. Serial No. 567,682.

*To all whom it may concern:*

Be it known that I, JUDSON SIDES, a citizen of the United States, residing at Abilene, in the county of Taylor and State of Texas, have invented certain new and useful Improvements in Ice-Cream-Dispensing Machines, of which the following is a specification.

This invention has reference to ice cream dispensing machines and its object is to provide for the ready and rapid packaging of ice cream in small containers which may be delivered to customers for shipment or storage.

The containers are made of the cake-like material of crisp consistency similar to that from which ice cream cones are made, such material not being affected by the presence of the ice cream, and the material of the containers are cooked or baked so as to effectively maintain their shape indefinitely.

The containers are made in cup-shape with a relatively broad base and a broader upper end, which latter, after the container is filled with ice cream is closed by a wafer-like cover of the same material as the cup so that both the cup itself and the ice cream may be eaten at the same time, both the material of the cup and the cover therefor being adapted to be subjected to a freezing process solidifying the ice cream to an extent to stand the shocks and jars of transportation.

The invention comprises a holder or reservoir for a mass of ice cream with a plunger adapted thereto and means for actuating the plunger, whereby chosen quantities of ice cream are forced from the reservoir into small containers holding a predetermined portion of the ice cream whereby each customer is provided with the same quantity of ice cream that every other customer is given.

The invention will be best understood from a consideration of the following detailed description taken in connection with the accompanying drawings, forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is an elevation of a machine embodying this invention, with some parts shown in vertical section.

Fig. 2 is an elevation at right angles to the showing of Fig. 1, with some portions broken away.

Fig. 3 is a section on the line 3—3 of Fig. 1.

Fig. 4 is a plan view of a portion of the structure shown in Fig. 1.

Fig. 5 is an elevation of the portion of the structure shown in Fig. 1, but taken from a view point at right angles thereto.

Fig. 6 is a section on the line 6—6 of Fig. 1.

Fig. 7 is a section on the line 7—7 of Fig. 1.

Fig. 8 is a section on the line 8—8 of Fig. 1.

Referring to the drawings, there is shown a table 1 mounted on legs 2 or other suitable support.

On the table 1 there is erected a frame 3 which may be in the form of an appropriate casting.

Projecting from the frame at an appropriate height above the surface of the table 1, is a forked shelf 4 shaped to receive and sustain a vessel 5 of a size to retain an appropriate quantity of ice cream indicated at 6.

The vessel 5 is provided with a hopper-like bottom 7 terminating at the lower end in a nozzle 8 from which ice cream may be ejected in a relatively small stream.

The vessel or container 5 is provided with a cover member 9, which for convenience, may be threaded in place, and this cover member is furnished with a central passage 10 serving as a guide for a piston rod 11 carrying a piston 12 within the container 5, and capable of moving up and down within the container 5 with sufficient but not undue snugness of fit.

At a point above the top 9 the frame 3 carries a guide bracket 13 traversed by the piston rod 11 and said piston rod is provided with a longitudinal series 14 of notches or teeth.

Traversing the casting 3 by way of a suitable bearing 15 therein, is a shaft 16, best shown in Fig. 6 and to one end of this shaft there is secured a pulley 17 encircled by a belt 18, in turn encircling a pulley 19 carried by an electric motor 20 furnishing driving power for the pulley 17 and in turn furnishing driving power for a wheel 21 having a circumferential groove 22 near its peripheral portion.

The wheel 21 carries in the groove 22 a circular series of stop blocks 23 made fast to the wheel in adjusted position by bolts 24 or other suitable fastening means permitting the adjustment of the blocks 23 circumferentially of the wheel 21, and one of the bolts 24 may be utilized as a fastening means for a crank handle 25.

In the particular showing of Fig. 1 of the drawing, four equidistantly disposed stop blocks 23 are shown.

The blocks 23 rotate with the wheel 21 and each block has a wedge-shaped outer end 25 radial to the axis of rotation of the blocks as made fast to the wheel 21 by the bolt 24.

Arranged in the path of each block 23 so as to be engaged by the wedge-shaped end 25 of the block is a roller 26 mounted in one end of an arm 27 mounted on a pivot or pin 28 projecting from a slide 29 guided in a slot 30 in an arm 31 fixed in position on the frame 3. The slide 29 is adjustable up and down by means of an adjusting screw 32 for moving the block 29 up and down in the slot 30.

The arm 27 has a right angular extension 33 rockable about the axis of the pin 28 and the end of the arm 33 remote from the block 29 carries a lock pin 34 with the free end of the pin presented toward the teeth 14 and urged by a spring 35 (see Fig. 8). The lock pin 34 is provided with another pin 36 traversing it and providing manipulating means whereby the latch 34 may be withdrawn from engagement with the teeth 14 when so desired.

Secured to the arm 33 is a rod 37 extending downwardly through the top of the table or support 1 and ending a short distance above the floor upon which the table 1 rests. A treadle 38 is secured to the rod 37 and pivoted to one of the legs 2 of the table so that the actuating bar 11 may be caused to reciprocate by the pressure of the foot of the operator, thereby pressing the plunger 12 downwardly to force ice cream through the funnel 8 and into a container 39 located thereunder upon the surface of the table 1.

In order to give to the arm 33 a normally rising impulse there is provided an extension spring 40 fast to the frame 3, while an adjustable stop 41 on the frame 3 permits but a limited movement of the arm 33, the degree of limitation being regulated by a set screw 42.

The ice cream receptacle 5 is held on the shelf carrying it by a strap 43 made of two parts with an intermediate hinge connection 44 and a lock or latch 45 at a diametrically opposite point.

What is claimed is:—

1. In an ice cream dispensing machine, a main supporting casting, an outstanding bracket carried by said casting, a cream container supported upon said bracket, having a nozzle at its bottom, a piston head in said container, a notched piston rod carried by said head and supported by said casting, a bell crank pivotally connected to the casting at a point removed from the piston rod support, one of the arms of said bell crank being of greater length than the other and engaging the notches on said piston rod, a shaft having a bearing in and extending through said casting, a pulley carried upon said shaft at one end, a wheel having a circumferential groove near its peripheral portion upon the opposite end of said shaft, independently circumferentially adjustable lugs positioned in said groove and intermittently engaging the shorter arm of said bell crank to cause the longer arm to move the said piston rod downward, and means for returning said bell crank to its operative position.

2. In an ice cream dispensing machine, a main supporting casting, an ice cream container having a nozzle at its under side, a forwardly extending bracket formed integral with said casting for supporting said container, a piston in the container, a notched piston rod carried by said piston, a rearwardly extending arm carried by said casting having an aperture through its outer end, a vertically adjustable block positioned in said aperture, an outstanding pin carried upon the side of said block, a bell crank lever pivotally mounted upon said pin, having a long and a short arm, the long arm engaging the notches in said piston rod, and rotatable means carried upon the casting for intermittently engaging the short arm of said lever for transmitting motion to the piston.

3. In an ice cream dispensing machine, a main supporting casting, an ice cream container having a nozzle at its under side, a forwardly extending bracket formed integral with said casting for supporting said container, a piston in the container, a notched piston rod carried by said piston, a rearwardly extending arm carried by said casting having an aperture through its outer end, a vertically adjustable block positioned in said aperture, an outstanding pin carried upon the side of said block, a bell crank lever pivotally mounted upon said pin, having a long and a short arm, the long arm engaging the notches in said piston rod, and rotatable means carried upon the casting for intermittently engaging the short arm of said lever for transmitting motion to the piston, and a crank handle carried by said rotating means for manually rotating the same.

4. In an ice cream dispensing machine, a main supporting casting, an ice cream container having a nozzle at its under side, a forwardly extending bracket formed integrally with said casting for supporting said container, a piston in the container, a notched piston rod carried by said piston, a rearwardly extending arm carried by said casting, a vertically adjustable block, carried in the end of said arm, a bell crank having one arm of greater length than the other, pivotally secured to the said block, and having in the end of the long arm an axial bore and a transverse slot passing through said bore, an expansible and contractile spring positioned in the rear of said bore, a lock pin positioned in said bore and opposing the said spring, said pin having a bore transversely thereof, a pin passing through the bore in said lock pin and through said transverse slot, said lock pin engaging the notches in said piston rod, a roller carried in the end of the shorter arm of said bell crank, a spring carried by the casting above and supporting the long arm of the bell crank, a vertically adjustable stop means for limiting the upward movement of said long arm, and intermittent means contacting with said roller for imparting motion to said piston through the bell crank.

In testimony whereof, I affix my signature hereto.

JUDSON SIDES.